3,457,263
PURINE COMPOUNDS
Gilbert Regnier, Sceaux, Roger Canevari, La Hay-les-Roses, Jean-Claude Le Douarec, Suresnes, and Michel Laubie, Vaucresson, France, assignors to Societe en nom Collectif dite: "Science Union et Cie Societe Francaise de Recherche Medicale," Suresnes, France, a French society
No Drawing. Filed Dec. 29, 1967, Ser. No. 694,357
Claims priority, application Great Britain, Jan. 17, 1967, 2,446/67
Int. Cl. A61k 17/00; C07d 57/38
U.S. Cl. 260—252
14 Claims

ABSTRACT OF THE DISCLOSURE

Purine compounds substituted: in the 2- or 6-position by

—N—CH$_2$—CH$_2$—NR—CH$_2$—CH$_2$ wherein R is AZ: A being a single bond or a saturated or unsaturated polymethylenic chain up to C$_4$, Z being pyridyl, pyrimidyl, or substituted or unsubstituted phenyl, phenoxy, or diphenylmethyl; and in 9-position by R' which is hydrogen, except when R is hydrogen or unsubstituted benzyl and the piperazinyl group is in the 6-position, or lower-alkyl, or mono- or di-hydroxylower-alkyl up to C$_4$, allyl and piperonyl.

These compounds possess antihypertensive, analgesic and central nervous system depressant properties.

---

The present invention provides purine compounds of the general formula:

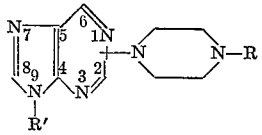
(I)

in which the piperazinyl radical is attached in the 2- or 6-position of the purine ring system, wherein R represents a radical A–Z, wherein A stands for a single bond or a polymethylene chain containing 1 to 4 carbon atoms inclusive which may be linear or branched and which may contain an ethylenic double bond, and Z stands for phenyl or phenyl substituted by halogen, trifluoromethyl (CF$_3$), lower-alkyl or lower-alkoxy containing up to 4 carbon atoms inclusive, or alkylenedioxy —O—(CH$_2$)$_m$—O— in which $m=1$ or 2; or phenoxy

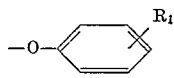

wherein R$_1$ represents hydrogen or halogen, lower-alkyl with up to 4 carbon atoms inclusive or lower-alkoxy with up to 4 carbon atoms inclusive; or diphenylmethyl

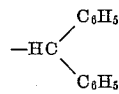

or diphenylmethyl substituted by halogen, lower-alkyl or lower-alkoxy with up to 4 carbon atoms inclusive; or a heterocyclic radical

in which X represents CH or N. R' represents hydrogen, except when R represents an unsubstituted benzyl radical and the piperazinyl radical

is fixed in the 6-position of the purine nucleus, or lower-alkyl or mono- or dihydroxylower-alkyl containing 1 to 4 carbon atoms inclusive, allyl or piperonyl.

A generally suitable process for the synthesis of the compounds of the invention comprises reacting a pyrimidine of the general formula

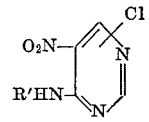
(II)

wherein the chlorine atom is in the 2- or 6-position of the pyrimidine ring with an N-monosubstituted piperazine of the general formula

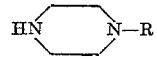
(III)

where R and R' have the meanings defined above.

The nitrated pyrimidine compound of the general formula

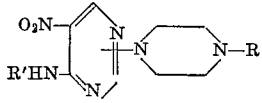
(IV)

obtained in the first stage of the process is then reduced by means of hydrogen and thereby transformed into a diamino compound of the general formula

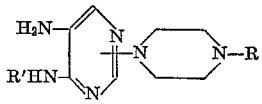
(V)

which is then finally converted into a purine compound of the general Formula I by the cyclization method described by Albert, Brown and Cheeseman in J. Chem. Soc., 1951, p. 475.

Th simplest way of performing this process comprises reacting primarily a chloronitropyrimidine (II) with an N-mono-substituted piperazine (III) in a polar solvent such, for example, as a tertiary aliphatic amide, for instance, dimethylformamide, at a temperature of 110 to 140° C., in the presence of an acceptor for the hydracid formed during the reaction such, for example, as an alkali metal carbonate, for instance, sodium or potassium carbonate.

The resulting nitro compound (IV) is then reduced by means of hydrogen, which is most advantageously done by dissolving the selected nitro compound (IV) in an alcohol of low molecular weight such, for example, as methanol or ethanol, whereupon the hydrogenation is carried out at room temperature under a hydrogen pressure of 2 to 10 atmospheres (gauge) in the presence of a hydrogenation catalyst such, for example, as Raney nickel.

The resulting diamino compound (V) is then transformed into a purine compound of the general Formula I by cyclization. This cyclization generally comprises heating the selected diamino compound (V), optionally in the form of an addition compound with a mineral acid, in an excess of formic acid or formamide. According to an improved version of this method, the diaminated compound (V) is heated in an excess of ethyl ortho-formate in the presence of acetic anhydride at a temperature of 110 to 130° C.

According to another generally applicable method of synthesizing these compounds, especially purine compounds of the general formula

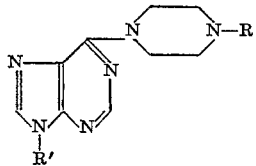

in which the piperazine radical is attached in the 6-position of the purine nucleus, a chloropurine of the general formula

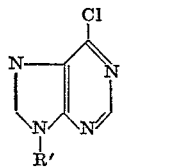

is reacted with an N-monosubstituted piperazine of the general Formula III; in these formulae R and R' have the meanings defined above.

This process is most advantageously performed by reacting a chloropurine (VI) with an N-monosubstituted piperazine (III) in solution in a polar solvent such, for example, as a tertiary aliphatic amide, for instance, dimethylformamide, at a temperature of 120° to 140° C. in the presence of an acceptor for the hydracid formed, such, for example, as an alkali metal carbonate, for instance, sodium or potassium carbonate, or in an excess of the monosubstituted piperazine (III) selected for the condensation.

The resulting new purine compounds are obtained in the form of weak bases which may be transformed into acid addition salts, and are in this form included in the present invention. As acids suitable for the formation of acid addition salts there may be mentioned from the mineral series the following acids: hydrochloric, hydrobromic, methanesulphonic, isothionic, sulphuric, phosphoric and sulphamic acids; from the organic series acetic, propionic, maleic, fumaric, tartaric, citric, oxalic and benzoic acids.

If desired, the resulting new derivatives may be purified by physical methods such, for example, as crystallization or chromatography; or chemically such, for example, as by formation of salts of addition with acids, followed by decomposition of these salts with alkaline agents.

These compounds and their physiologically tolerable acid addition salts included in this invention possess valuable pharmacological and therapeutic properties and may be used as medicaments, especially as anti-hypertensive, anti-inflammatory hypnotic and anti-epileptic drugs and, in general, as depressants for the central nervous system.

The following examples illustrate the invention but are not to be construed as limiting. Unless otherwise indicated, the melting points have been measured on a Kofler heater.

Example 1.—2-(4'-diphenylmethyl-piperazin-1'-yl)-purine 88 grams of 2-chloro-4-amino-5-nitro-pyrimidine are mixed with a solution of 140 grams of 1-diphenylmethyl-piperazine in 1 liter of dimethylformamide in the presence of 139 grams of anhydrous potassium carbonate and the whole is heated for 14 hours at 135° C.; then the salt is filtered off and the solvent evaporated under vacuum. There are obtained 215 grams of a thick oil which is treated with 1 liter of water and 3 liters of benzene at 50° C. The insoluble matter is filtered off, the benzene layer decanted and the benzene is reduced under vacuum to one-tenth its original volume. On suction-filtration, there are obtained 112 grams of yellow crystals of 2-(4'-diphenylmethyl-piperazin-1'-yl) - 4 - amino-5-nitro-pyrimidine, melting at 183° C. This product is suspended in 6 liters of methanol and hydrogenated at room temperature under a pressure of 10 atmospheres (gauge) in the presence of 110 grams of Raney nickel. As the hydrogenation progresses, the nitro compound dissolves. When the theoretical quantity of hydrogen has been absorbed, the catalyst is filtered off, and the methanol is evaporated under vacuum to one-twentieth its original volume. On suction-filtration, there are obtained 87 grams of purplish pink crystals of 2-(4'-diphenylmethyl-piperazin-1'-yl)-4,5-diamino-pyrimidine melting at 222° C.

A solution of 87 grams of this diamino compound in 1580 ml. of ethyl orthoformate and 710 ml. of acetic anhydride is heated for 6 hours at 120° C., then the solvent distilled off under vacuum and the residue treated for 1 hour at 50° C. with 700 ml. of 2 N-sodium hydroxide solution. After this time a brown solution results which is neutralized with 350 ml. of 4 N-hydrochloric acid. The resulting pinkish beige precipitate is suctioned off, washed with water and dried, to yield 78 grams of the crystalline crude base melting at 138° C. with decomposition, which is dissolved in 400 ml. of ethanol. The solution is filtered and 38.4 grams of methanesulphonic acid are added. The salt crystallizes out and is suctioned off, to yield 97 grams of the bis methanesulphonate of 2-(4'-diphenylmethyl-piperazin-1'-yl)-purine, melting (capillary) at 229 to 231° C. with decomposition. The corresponding pure base prepared from this salt melts at 210 to 212° C.

Examples 2–15

The following compounds are obtained by the process described in Example 1:

(2) 2-(4'-piperonyl-piperazin - 1' - yl)-purine. Melting point of its dihydrochloride (micro-Kofler) 195–196° C. (methanol), prepared from 2-(4'-piperonyl-piperazin-1'-yl)-4,5-diamino pyrimidine melting at 194° C., which itself is prepared from 2-(4'-piperonyl-piperazin-1'-yl)-4-amino-5-nitro-pyrimidine melting at 157–158° C.

(3) 2-(4' - ortho-methoxyphenyl - piperazin - 1' - yl)-purine, melting (micro-Kofler) at 239–240° C.; dihydrochloride melts (micro-Kofler) at 162–164° C. (isopropanol), prepared from 2-(4'-ortho-methoxyphenyl-piperazin-1'-yl)-4,5-diamino-pyrimidine whose trihydrochloride melts (micro-Kofler) at 163–165° C., which itself is obtained from 2-(4'-ortho-methoxyphenyl)-piperazin-1'-yl)-4-amino-5-nitro-pyrimidine melting at 176° C.

(4) 2-[4'-(3'',3''-diphenyl - propyl)-piperazine-1'-yl]-purine, melting (micro-Kofler) at 88–91° C. (isopropanol), prepared from 2-[4'-(3'',3''-diphenyl-propyl)-piperazin-1'-yl]4,5-diamino-pyrimidine whose dihydrochloride melts (micro-Kofler) at 175 to 178° C. with decomposition, which itself is obtained from 2-[4'-(3'',3''-diphenylpropyl)-piperazin-1'-yl]-4-amino-5 - nitro-pyrimidine melting at about 130° C. with decomposition.

(5) 2-[4'-(pyramid - 2'' - yl) - piperazin - 1' - yl]-purine melting (micro-Kofler) at 282–284° C., prepared from 2-[4'-(pyrimid - 2'' - yl) - piperazin - 1' - yl] - 4,5-diamino-pyrimidine melting at 175° C., which itself is obtained from 2-[4'-(pyrimid-2''-yl)-piperazin-1' - yl] - 4-amino-5-nitro-pyrimidine melting at 180–181° C. (from dimethylformamide/isopropanol).

(6) 2-[4'-(pyrimid - 2'' - yl) - piperazin - 1' - yl] - 9-methyl-purine melting at 195–198° C. (ethanol), prepared from 2-[4'-(pyrimid-2''-yl)-piperazin-1' - yl] - 4 - methyl-amino-5-amino-pyrimidine melting at 165° C., which itself is obtained from 2-[4'-(pyrimid-2''-yl)-piperazin-1'-yl]-4-methylamino-5-nitro-pyrimidine melting at 231° C. (dimethylformamide), which itself is obtained by condensing 1-(pyrimid-2'-yl) - piperazine with 2 - chloro - 4 - methyl-amino-5-nitro-pyrimidine.

(7) 2-[4'-diphenylmethyl - piperazin - 1' - yl] - 9 - methyl-purine melting at 193–195° C. (ethanol), prepared from 2-(4'-diphenylmethyl-piperazin - 1' - yl) - 4 - methylamino-5 - amino - pyrimidine melting at 256° C., which itself is obtained from 2-(4'-diphenylmethyl - piperazin - 1' - yl) - 4 - methylamino - 5 - nitro - pyrimidine melting at 197° C.

(8) 6-(4'-piperonyl-piperazin-1'-yl)-purine, melting at 257° C., prepared from 4-(4'-piperonyl-piperazin-1'-yl)-5,6-diamino-pyrimidine melting at 210° C., which itself is prepared from 4-(4'-piperonyl-piperazin-1'-yl)-5-nitro-6-amino-pyrimidine melting at 162° C.

(9) 6-(4'-cinnamyl-piperazin-1'-yl)-purine, melting at 224° C. (anhydrous methanol) prepared from 4-(4'-cinnamyl-piperazin-1'-yl)-5,6-diamino-pyrimidine melting at 149° C., which itself is prepared from 4-(4'-cinnamyl-piperazin-1'-yl)-5-nitro-6-amino - pyrimidine melting at 155° C.

(10) 6-(4'-phenylisopropyl-piperazin-1' - yl) - purine, melting (capillary) at 215–217° C. (anhydrous methanol), prepared from 4-(4'-phenylisopropyl-piperazin-1'-yl)-5,6-diamino-pyrimidine melting at 166° C., which itself is prepared from 4-(4'-phenylisopropyl-piperazin-1'-yl)-5-nitro-6-amino-pyrimidine melting at 168° C.

(11) 6-(4'-o-methoxyphenoxyethyl - piperazin - 1' - yl)-purine, melting at 209° C. (anhydrous methanol), prepared from 4-(4'-o-methoxy-phenoxyethyl-piperazin - 1'-yl)-5,6-diamino-pyrimidine melting at 180° C., which itself is prepared from 4-(4'-o-methoxy phenoxyethyl-piperazin-1' - yl) - 5 - nitro - 6 - amino - pyrimidine melting (capillary) at 110–112° C.

(12) 6(4'-phenylethyl-piperazin-1'-yl)-purine, melting at 243° C. (methanol/dimethylformamide 50/50), prepared from 4-(4'-phenylethyl-piperazin-1'-yl) - 5,6 - diamino-pyrimidine melting at 202° C., which itself is prepared from 4-(4'-phenylethyl-piperazin-1'-yl)-5-nitro - 6-amino-pyrimidine melting at 180° C.

(13) 6-[4'-(3'',3''-diphenyl - propyl) - piperazin - 1'-yl]-purine, melting at 200° C. (anhydrous methanol), prepared from 4-[4'-(3'',3''-diphenyl-propyl) - piperazin-1'-yl]-5,6-diamino-pyrimidine melting at 170° C., which itself is prepared from 4-[4'-(3'',3''-diphenyl-propyl)-piperazin-1'-yl]-5-nitro - 6 - amino pyrimidine melting at 158° C.

(14) 2-(4'-piperonyl - piperazin - 1' - yl) - 9 - methyl-purine, melting point (capillary) of bis methane sulfonate 236–240° C. (methanol), prepared from 2-(4'-piperonyl-piperazin-1'-yl)-4-methylamino - 5 - amino - pyrimidine melting at 140° C., which itself is prepared from 2-(4'-piperonyl-piperazin - 1' - yl) - 4 - methylamino - 5 - nitro pyrimidine melting at 150° C.

(15) 2-(4'-diphenylmethyl-piperazin-1' - yl) - 9 - hydroxyethyl-purine melting at 174° C. (ethyl acetate), prepared from 2-(4'-diphenylmethyl-piperazin-1'-yl)-4 - hydroxyethylamino-5-amino-pyrimidine melting at 176° C., which itself is prepared from 2-(4'-diphenyl-methyl-piperazin-1'-yl)-4-hydroxyethylamino-5-nitro-pyrimidine melting at 163° C.

Example 16.—2-(4'-cinnamyl-piperazin-1'-yl)-purine

A solution of 22.5 grams of the trihydrochloride of 2-(4'-cinnamyl-piperazin-1'-yl)-4,5-diamino - pyrimidine, melting at 210° C. (with decomposition), in 225 ml. of formamide is heated for one hour at reflux. The mixture is then cooled and 225 ml. of water and 125 ml. of concentrated ammonia are added. A precipitate of a gummy product is observed, which is extracted several times with warm benzene. After decanting, the benzenic solution is dried on potassium carbonate and the benzene is evaporated under reduced pressure. 10.5 grams of hydrated crystals of 2-(4'-cinnamyl-piperazin-1'-yl) purine, melting at 180° C., are obtained. 8 grams of white crystals melting (capillary) at 254–260° C., with decomposition, are obtained by formation of the dihydrochloride in anhydrous ethanol. 2-(4'-cinnamyl-piperazin-1'-yl)-4,5 - diamino-pyrimidine was prepared from 2-(4' - cinnamyl-piperazin-1'-yl)-4-amino-5-nitro - pyrimidine melting at 160° C.

Examples 17–25

The following compounds are obtained by the process described in Example 16.

(17) 2-(4'-phenylisopropyl-piperazin - 1' - yl) - purine, melting point (capillary) of dihydrochloride 261–267° C. (anhydrous ethanol), prepared from 2-(4'-phenyliso-propyl-piperazin-1'-yl)-4,5-diamino-pyrimidine, melting (capillary) at 112° C., whose trihydrochloride melts (capillary) at 260–267° C. (with decomposition), which is itself prepared from 2-(4'-phenylisopropyl-piperazin-1'-yl)-4-amino-5-nitro-pyrimidine, melting at 190° C.

(18) 2-(4'-phenylethyl-piperazin-1'-yl)-purine, melting point (capillary) of dihydrochloride 258–263° C. (anhydrous ethanol), prepared from 2-(4'-phenylethyl-piperazin-1'-yl)-4,5-diamino-pyrimidine, melting (capillary) at 124–127° C., whose trihydrochloride melts at 190° C. with decomposition, which is itself prepared from 2-(4'-phenylethyl-piperazin-1'-yl)-4 - amino - 5 - nitro - pyrimidine, melting at 180° C.

(19) 2-(4' - o - methoxyphenoxyethyl - piperazin - 1'-yl)-purine, melting point (micro-Kofler) of bis methane sulfonate 208–217° C. (anhydrous ethanol), prepared from 2-(4'-o-methoxyphenoxyethyl - piperazin - 1' - yl)-4,5-diamino-pyrimidine, melting (capillary) at 106–110° C., whose trihydrochloride melts (capillary) at 218–223° C. with decomposition, which is itself prepared from 2-(4'-o-methoxyphenoxyethyl-piperazin-1'-yl) - 4 - amino-5-nitro-pyrimidine, melting at 120° C.

(20) 2-(4'-piperonyl-piperazin-1'-yl)-9-hydroxethyl-purine, melting point (micro-Kofler) of dihydrochloride 235–240° C. (anhydrous methanol), prepared from 2-(4'-piperonyl-piperazin-1'-yl) - 4 - hydroxyethylamino-5-nitro-pyrimidine, melting at 94° C., whose trihydrochloride melts at 200° C. with decomposition, which is itself prepared from 2-(4'-piperonyl-piperazin-1'-yl)-4-hydroxyeth-ylamino-5-nitro-pyrimidine, melting at 144° C.

(21) 2 - (4'-piperonyl-piperazin-1'-yl) - 9-allyl-purine, melting point (micro-Kofler) of dihydrochloride 204–212° C. (anhydrous isopropanol), prepared from 2-(4'-piper-onyl - piperazin-1'-yl)-4-allylamino - 5 - amino-pyrimidine (oil), which is itself prepared from 2-(4'-piperonyl-pipera-zin-1'-yl) - 4-allylamino - 5 - nitro-pyrimidine, melting at 109° C.

(22) 2-(4'-diphenylmethyl - piperazin-1'-yl)-9-allyl-purine, melting point (capillary) of dihydrochloride 257–259° C. (anhydrous ethanol), prepared from 2-(4'-diphenylmethyl-piperazin-1'-yl) - 4-allylamino-5-amino-pyrimidine, melting at 169° C., which is itself prepared from 2-(4'-diphenylmethyl-piperazin-1'-yl) - 4 - allylamino-5-nitro-pyrimidine, melting at 134° C.

(23) 2-(4'-diphenylmethyl-piperazin-1'-yl) - 9 - piperonyl-purine, melting point (micro-Kofler) of bis methane sulfonate 140–144° C. (anhydrous ethanol), prepared from 2-(4'-diphenylmethyl - piperazin-1'-yl)-4-piperonyl-amino-5-amino-pyrimidine (oil), which is itself prepared from 2-(4'-diphenylmethyl - piperazin-1'-yl)-4-piperonyl-amino-5-nitro-pyrimidine, melting at 173° C.

(24) 2-(4'-piperonyl - piperazin-1'-yl)-9-piperonyl-purine, melting point (micro-Kofler) of dihydrochloride 237–242° C. (anhydrous methanol), prepared from 2-(4'-piperonyl - piperazin-1'-yl)-4-piperonylamino-5-amino-pyrimidine (oil), which is itself prepared from 2-(4'-piper-only-piperazin-1'-yl)-4-piperonylamino - 5 - nitro-pyrimidine, melting at 110° C. with decomposition.

(25) 2-(4'-piperonyl-piperazin-1'-yl) - 9 - (2'',3''-dihydroxypropyl)-purine, melting (capillary) at 215–222° C. (with decomposition), prepared from 2-(4'-piperonyl-piperazin-1'-yl)-4-(2'',3'' - dihydroxypropylamino)-5-amin perazin-1'-yl) - 4 - (2'',3'' - dihydroxypropylamino) - 5-amino-pyrimidine, whose trihydrochloride melts (capillary) at about 200° C. with decomposition, which is itself prepared from 2-(4'-piperonyl-piperazin - 1' - yl)-4-(2'',3''-dihydroxypropylamino)-5-nitro-pyrimidine, melting point (capillary) of dihydrochloride: 210–219° C.

Example 26.—6-(4'-diphenylmethyl-piperazin-1'-yl)-purine 19.5 grams of 6-chloro-purine are mixed with a solution of 65.4 grams of 1-diphenylmethyl-piperazine in 650 ml. of dimethylformamide, and the whole is heated for 6 hours at 155° C., then the solvent is evaporated under vacuum and the residue taken up in 1500 ml. of water and 500 ml. of ether, whereupon the product crystallizes out and is suctioned off, to yield 47.5 grams of crude base which is dissolved in 300 ml. of anhydrous ethanol. The solution is filtered and 26.8 grams of methane-sulphonic acid are added. The bis-methanesulphonate crystallizes out. Finally, there are obtained 56 grams of white crystals melting at 230° C. with decomposition. The corresponding base melts (micro-Kofler) at 275–276° C.

Examples 27–46

The following compounds are obtained by the process described in Example 26:

(27) 6-[4'-(pyrimid-2''-yl)-piperazin - 1' - yl]-purine, melting (micro-Kofler) above 350° C., prepared from 6-chloro-purine and 1-(pyrimid-2'-yl)-piperazine.

(28) 6-(4'-o-methoxyphenyl-piperazin - 1' - yl)-purine, melting point (capillary) of bis methane sulfonate 200–203° C. (anhydrous ethanol), prepared from 6-chloro-purine and 1-(o-methoxyphenyl)-piperazine.

(29) 6-(4'-piperonyl - piperazin-1'-yl)-9-hydroxyethyl-purine, melting point of dihydrochloride 270° C. with decomposition (anhydrous methanol), prepared from 6-chloro-9-hydroxyethyl-purine melting at 160° C. and 1-piperonyl-piperazine.

(30) 6-(4'-piperonyl - piperazin-1'-yl)-9-piperonyl-purine, melting point (micro-Kofler) of dihydrochloride 139–149° C. (methanol), prepared from 6-chloro-9-piperonyl-purine melting at 164° C. and 1-piperonyl-piperazine.

(31) 6-(4'-piperonyl - piperazin-1'-yl)-9-methyl-purine, melting point (capillary) of bis-methane sulphonate 197–200° C. (anhydrous ethanol), prepared from 6-chloro-9-methyl-purine melting at 140° C. and 1-piperonyl-piperazine.

(32) 6-(4'-diphenylmethyl-piperazin - 1' - yl)-9-piperonyl-purine, melting at 154° C. (anhydrous ethanol), prepared from 6-chloro-9-piperonyl-purine and 1-diphenyl-piperazine.

(33) 6-(4'-diphenylmethyl - piperazin - 1' - yl)-9-hydroxyethyl-purine, melting point (micro-Kofler) of dihydrochloride 213–217° C. (anhydrous methanol), prepared from 6-chloro-9-hydroxyethyl-purine and 1-diphenylmethyl-piperazine.

(34) 6-(4'-cinnamyl - piperazin-1'-yl)-9-piperonyl-purine, melting at 136° C. (ethanol), prepared from 6-chloro-9-piperonyl-purine and 1-cinnamyl-piperazine.

(35) 6-(4'-diphenylmethyl - piperazin-1'-yl)-9-(2'',3''-dihydroxypropyl)purine, melting (capillary) at 230–234° C. with decomposition, prepared from 6-chloro-9-(2',3'-dihydroxypropyl)-purine and 1-diphenylmethyl - piperazine.

(36) 6-(4'-m-trifluoromethylphenyl - piperazin-1'-yl)-purine, melting (capillary) at 280–287° C., prepared from 6-chloro-purine and 1-(m - trifluoromethylphenyl)-piperazine.

(37) 6 - [pyrid-2''-yl)piperazin-1'-yl] - purine, melting (capillary) at 300–305° C., prepared from 6-chloro-purine and 1-(pyrid-2'-yl) piperazine.

(38) 6-(4'-p-chlorophenyl-piperazin-1'-yl)-purine, prepared from 6-chloro-purine and 1-(p-chlorophenyl)-piperazine.

(39) 6-(4'-p-methylphenyl-piperazin-1'-yl)-purine, prepared from 6-chloro-purine and 1-(p-methylphenyl)-piperazine.

(40) 6-(4'-piperonyl-piperazin-1'-yl)-purine, prepared from 6-chloro-purine and 1-piperonyl piperazine.

(41) 6-(4'-phenoxyethyl - piperazin-1'-yl)-purine, prepared from 6-chloro-purine and 1-phenoxyethyl piperazine.

(42) 6-(4'-p-chlorophenoxyethyl - piperazin-1'-yl)-purine, prepared from 6-chloro-purine and 1-(p-chlorophenoxyethyl)-piperazine.

(43) 6-(4'-p-methylphenoxyethyl - piperazin-1'-yl)-purine, prepared from 6-chloro-purine and 1-(p-methylphenoxyethyl)-piperazine.

(44) 6-(4'-p-chlorobenzhydryl-piperazin - 1' - yl)-purine, prepared from 6-chloro-purine and 1-(p-chlorobenzhydryl)-piperazine.

(45) 6-(4'-p-methylbenzhydryl-piperazin - 1' - yl)-purine, prepared from 6-chloro-purine and 1-(p-methylbenzhydryl)-piperazine.

(46) 6-(4'-p-methoxybenzhydryl - piperazin-1'-yl)-purine, prepared from 6-chloro-purine and 1-(p-methoxybenzhydryl)-piperazine.

The toxicological and pharmacological study of the new compounds of the invention, and their physiologically tolerable salts, has shown they have a low toxicity and therapeutic properties as anti-hypertensive, analgesic and depressants for the central nervous system.

The $LD_{50}$ studied by intraperitoneal administration in mice varies from 88 to 600 m./kg., and from 360 to >2,000 mg./kg. by peroral administration.

Their action on the blood pressure was studied in the anesthetized normotic dog and in dogs rendered hypertonic by Goldblatt's method. Administered by the intravenous route at a dose of 5 mg./kg., the new compounds provoke a decrease of the systolic and diastolic blood pressure from 20 to 80 mm./hg. for 5 to >30 minutes.

By the "roller-test" of Dunham and Miya (J. Am. Pharm. Assoc. Ed. Sci., 46, 208 (1957)), the activity of the new compounds on the central nervous system was demonstrated, and it was noted that 50% of mice fall down from the rolling-bars with a dose varying from 5 to 40 mg./kg. I.P.

The analgesic activity was also observed in mice with the hot plate method of Woolf and MacDonald. An increase of the threshold of pain-perception was noted, going to 243% with doses varying from 20 to 50 mg./kg. I.P. and from 50 to 100 mg./kg. P.O.

The pharmacological properties, hereabove described, enable their use in human and animal therapy, especially in the treatment of hypertension, pain and different forms of hyperexcitability of the central nervous system.

The compounds of the invention may be administered in different pharmaceutical forms, in conjunction or admixture with a pharmaceutically suitable solid or liquid carrier such, for example, as distilled water, lactose, talc, gum arabic, magnesium stearate or ethyl-cellulose.

The doses may vary from 50 to 500 mg. in oral, rectal or parenteral administration.

Where the foregoing examples produce a compound having a methyl or other lower-alkyl group, which is not otherwise limited as to number of carbon atoms, it is to be understood that compounds containing other lower-alkyl groups of straight or branched nature and containing up to eight carbon atoms inclusive, such as methyl, ethyl, propyl, isopropyl, butyl, sec.-butyl, t.-butyl, amyl, isoamyl, hexyl, heptyl, and octyl are prepared in the same manner by substitution in the process of the appropriate different lower-alkyl starting material. Hydroxylower-alkyl radicals may carry primary, secondary or tertiary hydroxyl groups and have the same carbon atom limit action as lower-alkyl, unless otherwise limited. Likewise, where chloro or other halogen atom is present, although chlorine is preferred, further halogen compounds including iodo, bromo, chloro and fluoro compounds are prepared starting from the appropriate halogenated starting material. Similarly, unless otherwise limited, where methoxy or other lower-alkoxy group is present, compounds having other lower-alkoxy groups containing various lower-alkyl groups having up to eight carbon atoms inclusive are prepared in the same manner from the appropriate different lower-alkoxy starting material. In the same manner, ortho and meta substituted products are produced instead of para by utilizing the selected ortho or meta substituted starting material, and vice versa. Similarly, other molecular changes within the scope of the invention are readily made.

The compounds of the invention are generally characterized by the pharmacological activity hereinbefore stated, making them useful in counteracting certain physiological abnormalities in a living animal body. Effective quantities of the pharmacologically active compounds of the invention may be administered to a living animal body in any one of various ways, for example, orally as in capsules or tablets, parenterally in the form of sterile solutions, suspensions, or by pellet implantation, and in some cases intravenously in the form of sterile solutions. Other modes of administration are cutaneously, subcutaneously, bucally, intramuscularly, and intraperitoneally.

As representative of living animal bodies which may be treated with the compounds and compositions of the invention, and according to the method of treating of the invention, for alleviation of the same and/or similar conditions as those described, may be mentioned the following: domestic animals such as dogs and cats, farm animals such as horses, cows, sheep, and goats, fur-bearing animals such as mink, seal, muskrat, fox, racoon, ermine, and weasel, and zoo animals such as bears, antelope, foxes, monkeys, baboons, and the like.

Pharmaceutical formulations are usually prepared from a predetermined quantity of one or more of the compounds of the invention, preferably in solid form. Such formulations may take the form of powders, elixirs, solutions, pills, capsules, pellets or tablets, with or without, but preferably with, any one of a large variety of pharmaceutically acceptable vehicles or carriers. When in admixture with a pharmaceutical vehicle or carrier, the active ingredient usually comprises from about 0.01 to about 75 percent, normally from about 0.05 to about 15 percent, by weight of the composition. Carriers such as starch, sugar, talc, commonly used synthetic and natural gums, water, and the like, may be used in such formulations. Binders such as gelatin, and lubricants such as sodium stearate, may be used to form tablets. Disintegrating agents such as sodium bicarbonate may also be included in tablets.

Although relatively small quantities of the active materials of the invention, even as low as 1.0 milligram, may be used in cases of administration to subjects having a relatively low body weight, unit dosages are usually five milligrams or above and preferably twenty-five, fifty, or one-hundred milligrams or even higher, depending of course upon the subject treated and the particular result desired, as will be apparent to one skilled in the art. Broader ranges appear to be one to 500 milligrams per unit dose. The active agents of the invention may be combined for administration with other pharmacologically active agents, such as analgesics, sedatives, tranquilizers, steroids or hormones, or the like, or with buffers, antacids or the like, and the proportion of the active agent or agents in the compositions may be varied widely. It is only necessary that the active ingredient of the invention constitute an effective amount, i.e., such that a suitable effective dosage will be obtained consistent with the dosage form employed. Obviously, several unit dosage forms may be administered at about the same time. The exact individual dosages as well as daily dosages in a particular case will of course be determined according to well-established medical and/or veterinary principles.

It is to be understood that the invention is not to be limited to the exact details of operation or exact compounds, compositions, or procedures shown and described, as obvious modifications and equivalents will be apparent to one skilled in the art.

We claim:

1. A compound selected from the group consisting of (A) purine compounds of the Formula I

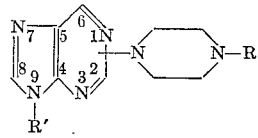

wherein the piperazinyl

radical is attached in the 2- or 6-position of the purine ring system, wherein R is AZ,
wherein A is selected from the group consisting of a single bond, a linear polymethylene chain containing 1 to 4 carbon atoms inclusive, a branched polymethylene chain containing 1 to 4 carbon atoms inclusive, a polymethylene chain containing an ethylenic double bond,
Z is selected from the group consisting of phenyl, halophenyl, trifluoromethylphenyl, lower-alkylphenyl, lower-alkoxyphenyl, methylene-dioxyphenyl, ethylene-dioxyphenyl, phenoxy, halophenoxy, lower-alkylphenoxy, lower-alkoxyphenoxy, diphenylmethyl, halodiphenylmethyl, lower-alkyldiphenylmethyl, lower-alkoxydiphenylmethyl, pyridyl and pyrimidyl,
R' is selected from the group consisting of hydrogen, except when R is unsubstituted benzyl, and the piperazinyl

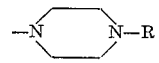

group is fixed in the 6-position of the purine nucleus, lower-alkyl, mono- and dihydroxylower-alkyl containing 1 to 4 carbon atoms inclusive, allyl and piperonyl; and (B) physiologically acceptable addition salts thereof with organic and mineral acids.

2. A compound of claim 1 which is 2-(4'-diphenyl-methyl-piperazin-1'-yl)-purine.

3. A compound of claim 1 which is 2-(4'-o-methoxyphenyl-piperazin-1'-yl)-purine.

4. A compound of claim 1 which is 2-[4'-(pyrimid-2''-yl)-piperazin-1'-yl]-purine.

5. A compound of claim 1 which is 2-(4'-diphenyl-methyl-piperazin-1'-yl)-9-methyl-purine.

6. A compound of claim 1 which is 6-(4'-piperonyl-piperonyl-piperazin-1'-yl)-purine.

7. A compound of claim 1 which is 6-(4'-o-methoxyphenoxyethyl-piperazin-1'-yl)-purine.

8. A compound of claim 1 which is 2-(4'-piperonyl-piperazin-1'-yl)-9-allyl-purine.

9. A compound of claim 1 which is 6-(4'-diphenyl-methyl-piperazin-1'-yl)-purine.

10. A compound of claim 1 which is 6-(4'-o-methoxyphenyl-piperazin-1'-yl)-purine.

11. A compound of claim 1 which is 6-(4'-piperonyl-piperazin-1'-yl)-9-piperonyl-purine.

12. A compound of claim 1 which is 6-(4'-diphenyl-methyl-piperazin-1'-yl)-9-hydroxyethyl-purine.

13. A compound of claim 1 which is 6-(4'-cinnamyl-piperazin-1'-yl)-9-piperonyl-purine.

14. A compound of claim 1 which is 6-(4'-diphenyl-methyl-piperazin-1'-yl) - 9 - (2'',3'' - dihydroxy-propyl)-purine.

References Cited

UNITED STATES PATENTS 3,331,843  7/1967  Tomcufcik et al. ____ 260—252

ALEX MAZEL, Primary Examiner

ANNE MARIE TIGHE, Assistant Examiner

U.S. Cl. X.R.

260—253; 424—240, 253

UNITED STATES PATENT OFFICE

CERTIFICATE OF CORRECTION

Patent No. 3,457,263            July 22, 1969

Gilbert Regnier et al.

It is hereby certified that errors appear in the above-identified patent and that said Letters Patent are hereby corrected as shown below:

Column 1, line 18
Appl. Page 1, line 2    : "by -N-$CH_2$-" should read

--- by piperazinyl -N-$CH_2$- ---

Column 6, line 25
Appl. Page 10, line 23  : "9-hydroxethyl-" should read

--- 9-hydroxyethyl- ---

Column 6, line 64          : delete whole line

Column 7, line 59
Appl. Page 13, line 14  : "6-[pyrid-" should read

--- 6-[4'-(pyrid- ---

Column 8, line 19
Appl. page 14, line 6   : "m./kg." should read --- mg/kg ---

Column 10, line 46
Appl. P. 19, Claim 6,
line 1                          : "piperonyl-piperonyl-piperazin"

should read --- piperonyl-piperazin -

SIGNED AND
SEALED

JUL 28 1970

(SEAL)
Attest:

Edward M. Fletcher, Jr.
Attesting Officer

WILLIAM E. SCHUYLER, JR.
Commissioner of Patents